Patented Aug. 20, 1940

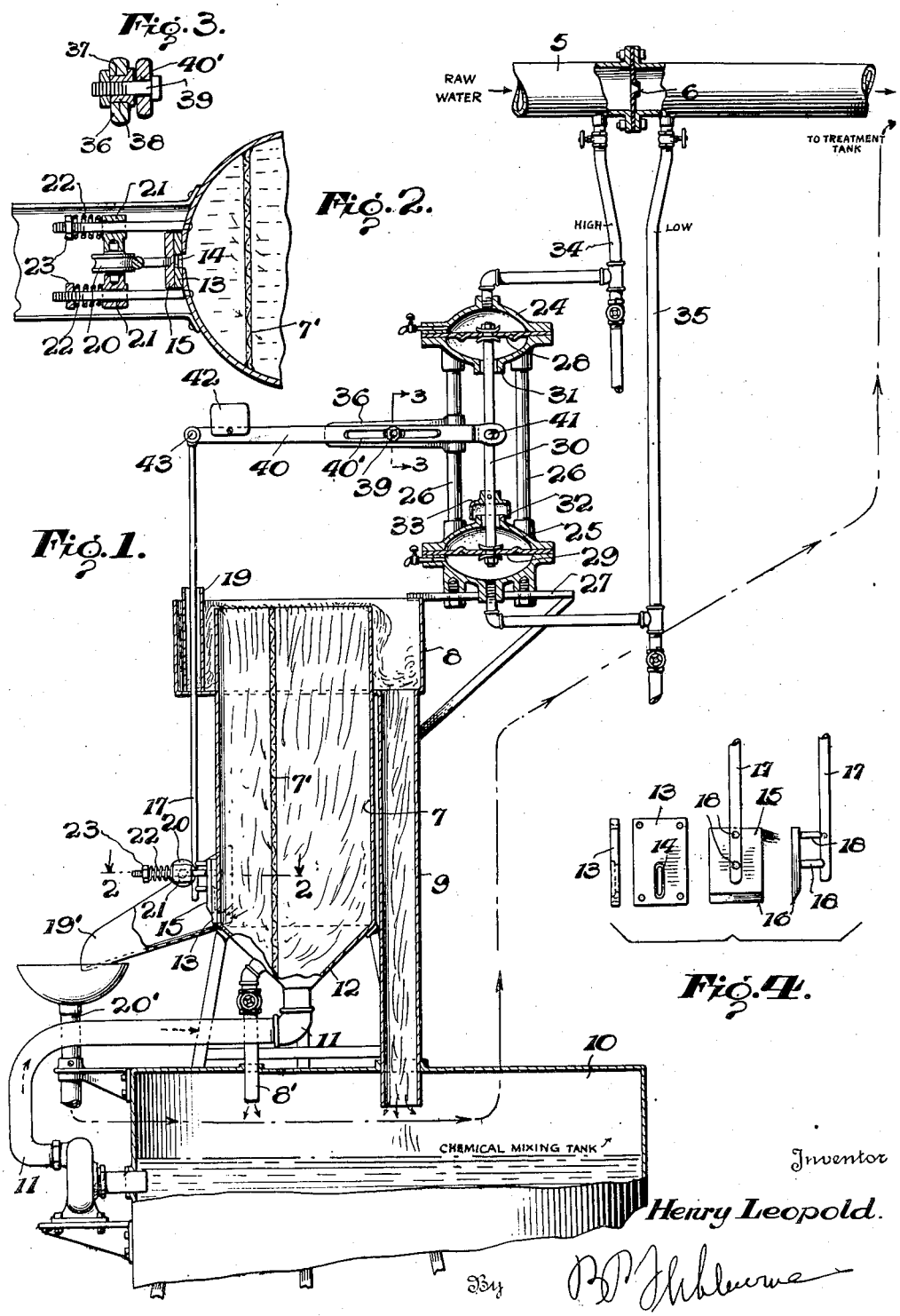

2,211,753

UNITED STATES PATENT OFFICE 2,211,753

PROPORTIONING APPARATUS

Henry Leopold, Fountain City, Tenn., assignor of one-third to L. T. Foley and one-third to William M. Nichols, both of Knoxville, Tenn.

Application May 6, 1939, Serial No. 272,288

4 Claims. (Cl. 210—31)

My invention relates to apparatus for producing continuously and automatically, a mixture of fluids, in predetermined proportions.

An important object of the invention is to provide apparatus of the above mentioned character, which may be employed for effecting a mixture of water, and chemicals in solution in predetermined proportions, and which apparatus will be sensitive and reliable in operation.

A further object of the invention is to provide means for screening or filtering the chemical solution prior to its discharge.

A further object of the invention is to provide means for effecting a constant circulation of the liquid chemical between the chemical mixing tank and the discharge tank and maintaining a constant level or head of the liquid chemical within the discharge tank.

A further object of the invention is to provide means for holding a slide valve in proper contact with its orifice plate.

Other objects and advantages of the invention will be apparent during the course of the following description.

In the accompanying drawing forming a part of this application and in which like numerals are employed to designate like parts throughout the same, Figure 1 is a central vertical longitudinal section through apparatus embodying my invention, Figure 2 is a horizontal section taken on line 2—2 of Figure 1, Figure 3 is a detail section taken on line 3—3 of Figure 1, and, Figure 4 are detail elevations of a stationary plate and plate-valve.

In the drawing, wherein for the purpose of illustration is shown a preferred embodiment of my invention, the numeral 5 designates a conduit or pipe receiving raw water and discharging the same to a treatment tank, not shown. A pressure differential varying directly with the flow of the water in the conduit 5 is produced by a metering orifice 6 in the conduit, and the pressures on opposite sides of the orifice are utilized for effecting a mixture of predetermined proportions of the water and a chemical solution.

The numeral 7 designates a preferably vertical discharge tank rigidly supported by any suitable means. The top of this tank is open. A trough 8 surrounds the tank 7 and extends above the same for a slight distance, as shown. The trough 8 has a drain pipe 9 extending downwardly for returning the overflow chemical solution into a chemical mixing tank 10. The chemical solution is withdrawn from the tank 10 by a pipe 11, having a pump connected therein and the pipe 11 discharges the chemical solution upwardly into the conical bottom 12 of the tank 7. The chemical solution is continuously circulated from the mixing tank 10 into the lower end of the discharge tank 7 and overflows about the top of the discharge tank 7 into the trough 8 and is returned through the pipe 9 into the mixing tank 10. The head or level of the chemical solution is maintained constant in the discharge tank 7. The discharge tank 7 is provided near its lower end with an orifice plate 13, having an elongated vertical discharge opening or orifice 14, through which the chemical solution discharges from the discharge tank 7. A slide plate-valve 15 slidably engages the outer face of the plate 13 and has a knife edge 16. The plate-valve 15 is adapted to cover and uncover the elongated opening 14, in whole or in part. The plate-valve 15 is connected with a vertical reciprocatory rod 17 by arms 18. The rod 17 passes through a sleeve 19, in the trough 8, but does not contact therewith. The chemical solution discharging through the opening 14 passes into a spout 19' and is fed thereby into a pipe 20' and is conveyed by this pipe 20' to the treatment tank. Arranged within the tank 7 is a screen or filter element 7', and the pipe 11 is arranged upon that side of the screen or filter element 7' remote from the discharge opening 14. It is thus seen that the chemical solution first passes through the screen or filter 7' before being discharged from the tank. The numeral 8' designates a small drain pipe leading into the bottom 12 and disposed upon that side of the screen or filter element 7' remote from the entrance of the pipe 11 into the bottom 12. Any solid particles or sediment will be returned through the drain pipe 8' into the mixing tank. The plate-valve 15 is held upon the plate 13 by a roller 20, engaging the rod 17, and carried by blocks 21, moved inwardly by springs 22. The tension of the spring may be regulated by adjustable nuts 23.

The numerals 24 and 25 designate superposed diaphragm chambers, preferably rigidly connected by rods 26. These rods may be secured to a stationary bracket 27, mounted upon the trough 8 and associated elements or mounted upon any other suitable support. Arranged within the diaphragm chamber 24 is a flexible diaphragm 28, and a flexible diaphragm 29 is arranged within the diaphragm chamber 25. These two diaphragms are connected by a rod 30. This rod 30 passes through a collar 31 carried by the diaphragm chamber 24 but has no contact therewith. This collar has its free end open and serves to freely place the lower portion of the chamber 24 beneath the diaphragm 28 in free communication with the atmosphere. The rod 30 also passes through a collar 32 formed upon the upper end of the diaphragm chamber 25 and has no contact therewith. The collar 32 has its free end open and serves to place the upper portion of the chamber 25 above the diaphragm 29 in free communication with the atmosphere. The rod 30 may be equipped with a cap 33, arranged above the collar 32 for preventing foreign matter from passing into the collar 32, but this cap is permanently spaced from the collar 32, as shown. Experience has shown that where the pressure differential is applied to the opposite sides of a single diaphragm, that the connecting rod must operate within a stuffing box. Slight leakage of the stuffing box will disturb the accurate operation of the device, and the binding action of the stuffing box is also disadvantageous. A feature of the present invention is that by the use of two diaphragms and the rod connecting them, that all stuffing box or stuffing boxes are eliminated, whereby leakage of the liquid under pressure is prevented, and the operation of the apparatus rendered more accurate and sensitive. Leading into the top of the diaphragm chamber 24 is a pipe 34 which leads into the conduit 5 upon the intake side of the metering orifice 6. A pipe 35 leads into the conduit 5 upon the outlet side of the metering orifice and the pipe 35 leads into the diaphragm chamber 25 beneath the diaphragm 29.

Rigidly mounted upon one of the rods 26 is a horizontal arm 36, having an elongated slot 37, within which a block 38 is adjustably mounted and may be clamped in the selected adjusted position by any suitable means. This block carries a pivot 39, which pivotally supports a vertical swinging lever 40, and operates within the longitudinal slot 40' of the lever, the inner end of which is pivotally connected with the rod 30 by means of a pin 41. The outer end of the lever 40 may have a weight 42 adjustably mounted thereon to counter-balance rod 30 and associated elements. The lever 40 has its outer end pivotally connected at 43 with the vertical rod 17.

The operation of the apparatus is as follows:

The plate-valve 15 may have a starting position for uncovering a selected amount of the discharge opening 14, so that a predetermined amount of the chemical solution is constantly supplied through the pipe 20' to the treatment tank, for a selected pressure differential upon the diaphragms 28 and 29. As the volume of water passing through the pipe 5 varies, increasing or decreasing, this given pressure differential upon the opposite sides of the diaphragms 28 and 29 will vary accordingly. If the pressure differential increases, the diaphragms 28 and 29 are lowered, moving the rod 30 downwardly and swinging lever 40 upon the pivot 39. This action will raise the plate-valve 15 and further uncover the elongated discharge opening. Should the pressure differential decrease, the diaphragms 28 and 29 will rise, and this action will swing the other end of the lever 40 downwardly shifting the plate-valve 15 downwardly.

It is to be understood that the form of my invention herewith shown and described is to be taken as a preferred example of the same and that various changes in the shape, size, and arrangement of parts, may be resorted to, without departing from the spirit of my invention or the scope of the subjoined claims.

Having thus described my invention, what I claim is:

1. A proportioning apparatus, comprising a conduit for receiving fluid and having a metering orifice, separate diaphragm chambers, a flexible diaphragm in each chamber, each chamber having one side closed to the atmosphere and the opposite side open to the atmosphere, a pipe leading into the conduit upon one side of the metering orifice and leading into the closed side of one diaphragm chamber, a second pipe leading into the conduit upon the opposite side of the metering orifice and leading into the closed side of the other diaphragm chamber, means connecting the diaphragms so that they move in unison, a mixing tank, a discharge tank having a permanently open overflow opening leading into the mixing tank, a valve for controlling the passage of the liquid from the discharge tank and operating independently of the overflow of the liquid back into the mixing tank, means connecting the valve with the means which connects the diaphragms, a pipe receiving the liquid passing the valve to discharge the same into the fluid passing through said conduit, and a pump for withdrawing the liquid from the mixing tank and introducing the same into the discharge tank.

2. A proportioning apparatus, comprising a fluid conduit having a metering orifice, separate diaphragm chambers, a flexible diaphragm in each chamber, each chamber having one side closed to the atmosphere and its opposite side provided with an opening which places such side in communication with the atmosphere, a pipe leading into the conduit upon one side of the metering orifice and leading into the closed side of one diaphragm chamber, a second pipe leading into the conduit upon the opposite side of the metering orifice and leading into the closed side of the other diaphragm chamber, a rod passing through the openings of the diaphragm chambers and having a considerably smaller diameter than the bore of said openings and connected with the diaphragms, a pivoted lever connected with the rod, a mixing tank, a discharge tank arranged above the mixing tank and provided near its top with a permanently open overflow opening discharging back into the mixing tank, a valve to control the discharge of the liquid from the discharge tank and operating independently of the overflow of the liquid from the discharge tank back to the mixing tank, an element connected with the valve and connected with the pivoted lever, a pipe to receive the liquid passing the valve and serving to supply the same to the fluid passing through said conduit, and a pump serving to withdraw the fluid from the mixing tank and to introduce the same into the discharge tank.

3. A proportioning apparatus, comprising a fluid conduit having a metering orifice, separate diaphragm chambers, a flexible diaphragm in each chamber, each chamber having one side closed to the atmosphere and the opposite side open to the atmosphere, a pipe leading into the conduit upon one side of the metering orifice and leading into the closed side of one diaphragm chamber, a second pipe leading into the conduit upon the opposite side of the metering orifice and leading into the closed side of the other diaphragm chamber, a rod passing into the open sides of the diaphragm chambers and connected with the diaphragms, a pivoted lever connected with the rod, a mixing tank, a substantially vertical discharge tank arranged above the mixing tank and provided adjacent to its upper end with a permanently open overflow opening for discharging the fluid back into the mixing tank, a conduit leading into the mixing tank and discharging into the substantially vertical discharge tank adjacent to its bottom, a pump in the conduit to force the liquid into the discharge tank, a valve for controlling the discharge of the liquid from the substantially vertical discharge tank and arranged near the bottom of the discharge tank and operating independently of the overflow of the liquid back to the mixing tank, a rod connecting the valve and the pivoted lever, and a pipe receiving the liquid passing the valve and serving to introduce the same into the presence of the fluid passing through said conduit.

4. A proportioning apparatus, comprising a fluid conduit having a metering orifice for producing a pressure differential in the conduit, pressure operated means connected with the conduit upon opposite sides of the metering orifice and responsive to the pressure differential, a substantially vertical discharge tank for holding a liquid, a filtering partition extending within the discharge tank substantially from its top to its bottom within the tank, a mixing tank, means for catching liquid overflowing from the top of the discharge tank and returning the same to the mixing tank, means to withdraw liquid from the mixing tank and feeding the same into the lower portion of the discharge tank upon one side of the filtering partition, and a valve for controlling the feeding of liquid from the discharge tank and arranged near the lower portion of the discharge tank upon the opposite side of the filtering partition and connected with the pressure operated means to be actuated thereby, said valve operating independently of the overflow of the liquid from the discharge tank, and a pipe receiving the liquid passing the valve and serving to introduce the same into the presence of the fluid passing through the conduit.

HENRY LEOPOLD.